(12) United States Patent
O'Brien, II et al.

(10) Patent No.: US 7,661,442 B2
(45) Date of Patent: Feb. 16, 2010

(54) COMPACT HYDRAULIC ACCUMULATOR

(75) Inventors: James A. O'Brien, II, La Salle, MI (US); Gerald Roston, Saline, MI (US); Ralph Hubbs, Brooklyn, MI (US)

(73) Assignee: Limo-Reid, Inc., Deerfield, MI (US)

( * ) Notice: Subject to any disclaimer, the term of this patent is extended or adjusted under 35 U.S.C. 154(b) by 0 days.

(21) Appl. No.: 12/138,765

(22) Filed: Jun. 13, 2008

(65) Prior Publication Data

US 2008/0308168 A1    Dec. 18, 2008

Related U.S. Application Data

(60) Provisional application No. 60/943,930, filed on Jun. 14, 2007.

(51) Int. Cl.
*F16L 55/04* (2006.01)

(52) U.S. Cl. .......................... 138/31; 138/30

(58) Field of Classification Search .............. 138/31, 138/30, 26; 137/538, 514.5
See application file for complete search history.

(56) References Cited

U.S. PATENT DOCUMENTS

| | | | | |
|---|---|---|---|---|
| 1,841,337 | A | * | 1/1932 | Roessler ...................... 137/538 |
| 1,879,020 | A | * | 9/1932 | Balsiger ...................... 137/538 |
| 2,005,813 | A | * | 6/1935 | Thorsen ...................... 137/494 |
| 2,011,333 | A | * | 8/1935 | Clifton ....................... 137/538 |
| 2,417,873 | A | | 3/1947 | Huber |
| 2,703,108 | A | | 3/1955 | McCuistion |
| 2,715,419 | A | | 8/1955 | Ford et al. |
| RE24,223 | E | | 9/1956 | Ford et al. |
| 2,928,417 | A | * | 3/1960 | Buckner et al. ............. 137/538 |
| 3,850,195 | A | * | 11/1974 | Olsson ....................... 137/503 |
| 4,187,682 | A | | 2/1980 | Shen |
| 4,518,955 | A | * | 5/1985 | Meyer ........................ 340/605 |
| 4,577,663 | A | | 3/1986 | Andersen et al. |
| 4,611,634 | A | | 9/1986 | Kruckewitt et al. |
| 4,714,094 | A | | 12/1987 | Tovagliaro |
| 5,018,547 | A | * | 5/1991 | Alcorn ....................... 137/111 |
| 5,098,354 | A | | 3/1992 | Kuwayama et al. |
| 5,507,144 | A | | 4/1996 | Gray, Jr. et al. .............. 60/327 |
| 5,771,936 | A | | 6/1998 | Sasaki et al. |
| 6,068,022 | A | * | 5/2000 | Schultz et al. .............. 137/538 |
| 6,390,133 | B1 | | 5/2002 | Patterson et al. |
| 6,478,051 | B1 | | 11/2002 | Drumm et al. |
| 6,619,325 | B2 | | 9/2003 | Gray, Jr. |
| 6,631,734 | B2 | * | 10/2003 | Smith, III ................. 137/614.2 |
| 6,644,354 | B2 | | 11/2003 | Dinkel et al. |

(Continued)

*Primary Examiner*—Patrick F Brinson
(74) *Attorney, Agent, or Firm*—Fraser Clemens Martin & Miller LLC; William J. Clemens

(57) ABSTRACT

A lightweight, optimally efficient, easily serviced, piston-in-sleeve high pressure accumulator is provided. The accumulator includes one or more cylindrical composite pressure vessel separate end cap manifolds. A piston slidably disposed in a thin impermeable internal sleeve in the accumulator separates two chambers, one adapted for containing a working fluid and the other adapted for containing gas under pressure. Gas is provided in a volume between the impermeable internal sleeve and the composite pressure vessel wall. Additional gas is optionally provided in gas cylinders. Further components are provided for withstanding harmful effects of radial flexing of the composite vessel wall under high pressures, and from stresses present in use in mobile applications such as with a hydraulic power system for a hydraulic hybrid motor vehicle.

18 Claims, 4 Drawing Sheets

U.S. PATENT DOCUMENTS

| | | | |
|---|---|---|---|
| 6,834,680 B2 * | 12/2004 | Baugh | 138/31 |
| 6,866,066 B2 | 3/2005 | Weber | |
| 7,066,208 B2 | 6/2006 | Kort et al. | |
| 7,097,748 B2 | 8/2006 | Duffy et al. | 204/237 |
| 7,108,016 B2 | 9/2006 | Moskalik et al. | |
| 2006/0075892 A1 | 4/2006 | Dorr | 92/5 R |
| 2007/0044461 A1 | 3/2007 | Burdick et al. | 60/413 |

* cited by examiner

COMPACT HYDRAULIC ACCUMULATOR

CROSS-REFERENCE TO RELATED APPLICATIONS

This application claims the benefit of U.S. Provisional Application No. 60/943,930, filed on Jun. 14, 2007. The entire disclosure of the above application is hereby incorporated herein by reference.

FIELD OF THE INVENTION

The present disclosure relates generally to accumulators for high pressure applications, and more particularly to high pressure accumulators of the piston-in-sleeve (or "piston and sleeve") type. The disclosure further relates to the potential use of such accumulators in conjunction with fuel efficient hydraulic hybrid motor vehicles.

BACKGROUND OF THE INVENTION

1. Hydraulic Hybrid Vehicles

Hybrid powertrains are an increasingly popular approach to improving the fuel utilization of motor vehicles. The term "hybrid" refers to the combination of a conventional internal combustion engine with an energy storage system, which typically serves the functions of receiving and storing excess energy produced by the engine and energy recovered from braking events, and redelivering this energy to supplement the engine when necessary. This decouples the production and consumption of power, thereby allowing the internal combustion engine to operate more efficiently, while making sure that enough power is available to meet load demands.

Several forms of energy storage are known in the art, with electrical storage using batteries being the best known. Recently, hydraulic hybrids have been demonstrated to offer better efficiency, greater power density, lower cost, and longer service life than electric hybrids. A hydraulic power system takes the form of one or more hydraulic accumulators for energy storage and one or more hydraulic pumps, motors, or pump/motors for power transmission. Hydraulic accumulators operate on the principle of storing energy by compressing a gas. An accumulator's pressure vessel contains a charge of gas, typically nitrogen, which becomes compressed as the hydraulic pump pumps liquid into the vessel. The liquid thereby becomes pressurized and may be used to drive the hydraulic motor when released. A hydraulic accumulator thus utilizes two distinct working media; one a compressible gas and the other a relatively incompressible liquid. More generally, an accumulator utilizes two distinct working media, at least one of which is a gas and the other a gas or a fluid. Throughout this disclosure, the term "gas" shall refer to the gaseous medium and the term "fluid" shall refer to the gaseous or the liquid working medium, as is customary in the art.

2. High Pressure Accumulator Designs in the Present State of the Art

In the present state of the art, there are three basic configurations for hydraulic accumulators: spring type, bladder type and piston type.

Spring type is typically limited to accumulators with small fluid volumes due to the size, cost, mass, and spring rates of the springs.

Bladder accumulators typically suffer from high gas permeation rates and poor reliability. Some success has been achieved by replacing the elastic bladder with a flexible metallic or metallic-coated bellows structure, for example, as disclosed in U.S. Pat. No. 5,771,936 to Sasaki et al. and U.S. Pat. No. 6,478,051 to Drumm et al. However, a principal shortcoming of this approach lies in the potential for the bellows to experience stresses and longitudinal disorientation that may rapidly lead to failure under a severe duty cycle, such as would be present in an automotive power system application.

Of the three basic configurations in the present state of the art, the piston type is the least costly design that can store desirable volumes of fluid. In addition, properly designed piston accumulators are physically robust, efficient, and reliable.

Standard piston accumulators are also well represented in the art. In a standard piston accumulator, the hydraulic fluid is separated from the compressed gas by means of a piston which seals against the inner walls of a cylindrical pressure vessel and is free to move longitudinally as fluid enters and leaves and the gas compresses and expands. Because the piston does not need to be flexible, it may be made of a gas impermeable material such as steel. However, the interface between the piston and the inner wall of the cylinder must be controlled tightly to ensure a good seal, and the degree of dimensional tolerance necessary to ensure a good seal may increase the cost of manufacturing. It also requires that the pressure vessel be extremely rigid and resistant to expansion near its center when pressurized, which would otherwise defeat the seal by widening the distance between the piston and cylinder wall. This has eliminated the consideration of composite materials for high pressure piston accumulator vessels, as composite materials tend to expand significantly under pressure (e.g., about 1/10 of an inch diametrically for a 12 inch diameter vessel at 5,000 psi pressure).

As a result of the foregoing, standard piston accumulator vessels tend to be made of thick, high strength steel and are very heavy. Standard piston accumulators have a much higher weight to energy storage ratio than either steel or composite bladder accumulators, which makes them undesirable for mobile vehicular applications (as such increased weight would, for example, reduce fuel economy for the vehicle). More specifically, piston accumulators for the same capacity (i.e., size) and pressure rating are many times heavier (e.g., by up to 10 times) than an accumulator with a lightweight composite pressure vessel design, as would be preferred in such applications where accumulator weight is an issue. Therefore, despite their potentially superior gas impermeability, piston accumulators are largely impractical for vehicular applications.

3. Prior Art Regarding Piston-in-Sleeve Accumulator Designs

One piston accumulator concept utilizes a piston and sleeve assembly, in which the piston resides within and seals against a cylindrical sleeve that is separate from the inner wall of the pressure vessel. As defined herein, the term "sleeve" includes a hollow member substantially incapable of withstanding stresses that would be applied thereto were a full pressure differential of the accumulator to be applied across the hollow member. This piston-in-sleeve approach provides at least two benefits over the prior art for high pressure accumulators, namely (i) separating the pressure containment function of the vessel wall from its piston sealing function, allowing an effective seal to be pursued with a sleeve independently of issues relating to pressure vessel construction, and (ii) providing an intervening or "interstitial" volume between the sleeve and vessel wall which may be filled with the charge gas to allow tailoring of the ratio of gas to fluid to optimize performance and which also allows shaping" the pressure profile of the discharged fluid. In each of U.S. Pat. No. 2,417,873 to Huber, U.S. Pat. No. 2,703,108 to McQuistion, U.S. Pat. No. RE24,223 to Ford, and later U.S. Pat. No. 4,714,094 to Tovagliaro, the use of a piston and sleeve assembly on a high pressure accumulator is taught. Such designs comprise a generally thick-walled strong cylindrical pressure vessel constructed of a steel alloy, and a metal sleeve which is thin relative to the vessel walls. The sleeve is permanently attached to the inner surface of one end of the pressure vessel near its circumference, creating (with the piston) a closed or "inside" chamber for the working fluid. The other end of the sleeve extends toward the other end of the vessel and is generally left open to create an "outside" chamber that consists of the open volume of the sleeve, the remaining volume of the pressure vessel, and the intervening/interstitial space between the outer wall of the sleeve and the inner wall of the pressure vessel, each filled with the gaseous medium of the accumulator.

In operation of these prior art piston-in-sleeve accumulator designs, the sleeve must be tightly retained and centered within the vessel to prevent radial movement, for example, due to vibrations in use with mobile (e.g. aircraft) applications. Sleeve movement would fatigue the rigid fixed end of the sleeve possibly leading to leakage due to cracking, distortion, or wear of the sealing gasket if one is present. This requires the sleeve to either be stiffened by connecting it at points to the vessel wall, or requires the sleeve to be thicker than the minimum that would be necessary to withstand the small pressure differentials normally encountered in charging and discharging. Further, the outer walls of the vessel must be thicker than would be necessary for pressure containment alone because the walls must be prevented from expanding and thus loosening the sleeve or distorting it from the true circular form necessary for piston sealing.

Prior art piston-in-sleeve designs also uniformly contain the fluid within the closed (inside) chamber, with the charge gas residing on the other side of the piston and in the interstitial space between the sleeve and vessel wall. This fluid-inside, gas-outside arrangement is used in the prior art for at least two reasons. First, as mentioned above, the prior inventors sought a resistance to structural splitting. Second, this arrangement is naturally preferable because it maximizes the fluid capacity and hence energy capacity of the device. That is, the working medium that resides inside the sleeve may be discharged completely, while some portion of the medium outside the sleeve will always remain trapped in the interstitial space; because working capacity is determined by how much fluid may be discharged, it is a natural choice to have the fluid reside on the inside of the sleeve and gas on the outside.

Like standard piston accumulators discussed above, these prior art piston-in-sleeve accumulators are unacceptably heavy for a hydraulic hybrid motor vehicle application or other application where accumulator weight is a significant issue. Notably, U.S. Pat. No. 4,714,094 to Tovagliaro attempts to reduce the weight of such piston-in-sleeve accumulators through the use of lightweight composite materials in place of steel for the pressure containment function in the vessel wall. However, the Tovagliaro device still requires an internal metallic core to the vessel wall (in addition to the composite envelope, likely at least in part to resist permeation of the gas under pressure out through the composite vessel wall) and a thickened metal area at one (flat) end of the accumulator (to enable providing a removable end cap and to tightly retain and center the sleeve, as discussed above). As such, the Tovagliaro device would still remain undesirably heavy for a hydraulic hybrid motor vehicle application, and would also entail significantly greater manufacturing cost than desired (e.g., because of complexity of the design and entailing vessel construction with both a composite envelope and metallic core and end). In addition, the internal metallic core (or liner) used in conjunction with composite materials would be unacceptable for use in hydraulic hybrid vehicles. The intense duty cycle experienced by the accumulator (i.e., the extremely large number of charge-discharge cycles, in some cases exceeding one million cycles) and the significant radial expansion of composite materials (about $\frac{1}{10}$ of one inch diametrically for a 12 inch diameter vessel at 5,000 psi pressure) together would result in expected fatigue failure of the metal core or liner.

In addition, the flat end construction (on at least one end) of prior art piston accumulators also adds significantly to the complexity, weight and cost of the accumulator.

The most recent attempt to resolve these short-comings is disclosed in U.S. Pat. No. 7,108,016 to Moskalik. The Moskalik device employs a thermoplastic sleeve, with a carbon-fiber wound pressure vessel shell. The Moskalik device also places the fluid outside the core, thus the fluid fills the interstitial spaces. There are several significant short-comings with this design. First, the physical size of the accumulator is larger than necessary to enclose the same volume of useful working fluid as the fluid in the interstitial spaces cannot be used. Second, as will be described below, optimal accumulator design requires that the gas volume be greater than the fluid volume. Third, the design cannot be serviced—any failure of any component requires that the entire cylinder be discarded. Fourth, the thickness of the pressure vessel wrapping is thicker than needed because the wrapping must counter both axial and tangential loads. Fifth, the design does not provide the means to protect the integrity of the sleeve should the fluid pressure exceed that of the gas pressure.

4. Disadvantages of the Prior Art

In summary, as has been explained above, despite the many years of development for accumulator designs, the prior art has thus far failed to provide a high pressure accumulator design that is modular, lightweight, low cost, durable under stresses, easy to assemble and maintain, all while providing optimal performance. Prior art bladder accumulators have unacceptable permeation. Prior art metal bellows accumulators are not sufficiently durable under stresses. Prior art piston accumulators of all types are unacceptably heavy and costly. As a result, the prior art has failed to provide a high pressure accumulator that is satisfactory for hydraulic hybrid motor vehicle applications, as is desired for the present invention.

SUMMARY OF THE INVENTION

In concordance with the instant disclosure, a high pressure piston and sleeve accumulator design that is optimally efficient, extremely light weight, easily serviceable, adaptable to service in mobile vehicles, and can be mass produced at low cost, is surprisingly discovered.

The present invention utilizes a piston and sleeve design, but through various means enables use of a extremely lightweight, easy to assemble, and easy to manufacture composite pressure vessel therewith, thereby providing an optimized high pressure accumulator and satisfying a long felt need for such an accumulator in the art. As will be described in greater detail hereafter, applicant meets these needs through one or more of various modifications from the piston accumulator prior art, including using a modular design that comprises accumulator cylinders and auxiliary gas cylinders, providing manifolds with tension members as removable end caps, including a specially configured valve to prevent possible damage to the sleeve, and facilitating assembly and repair by using non-permanent seals.

In one embodiment, an accumulator assembly includes at least one accumulator cylinder. The accumulator cylinder has a cylindrical, gas-impermeable shell, and a cylindrical, gas-impermeable sleeve disposed within and substantially concentric with the shell. An interstitial space is formed between the sleeve and the shell. A piston is slidably disposed within the sleeve. The piston separates an interior of the sleeve into a first chamber configured to contain a compressed gas, and a second chamber configured to contain a pressurized fluid. A pair of axial closures is disposed at opposing ends of the accumulator cylinder. The axial closures may include a gas manifold and a fluid manifold. At least one tension member is further disposed between the axial closures and coupled thereto for holding the accumulator assembly together.

In another embodiment, an accumulator system includes the accumulator assembly and at least one auxiliary gas cylinder in communication therewith.

In a further embodiment, a pressure relief valve for the accumulator system includes a hollow cylinder body having a fluid valve port formed at a first end of the cylinder body, a gas valve port formed at a second end of the cylinder body, and a drain relief port formed through a wall of the cylinder body. A valve piston is slidably disposed within the cylinder body. A biasing means is disposed in the cylinder body between the piston and the second end.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
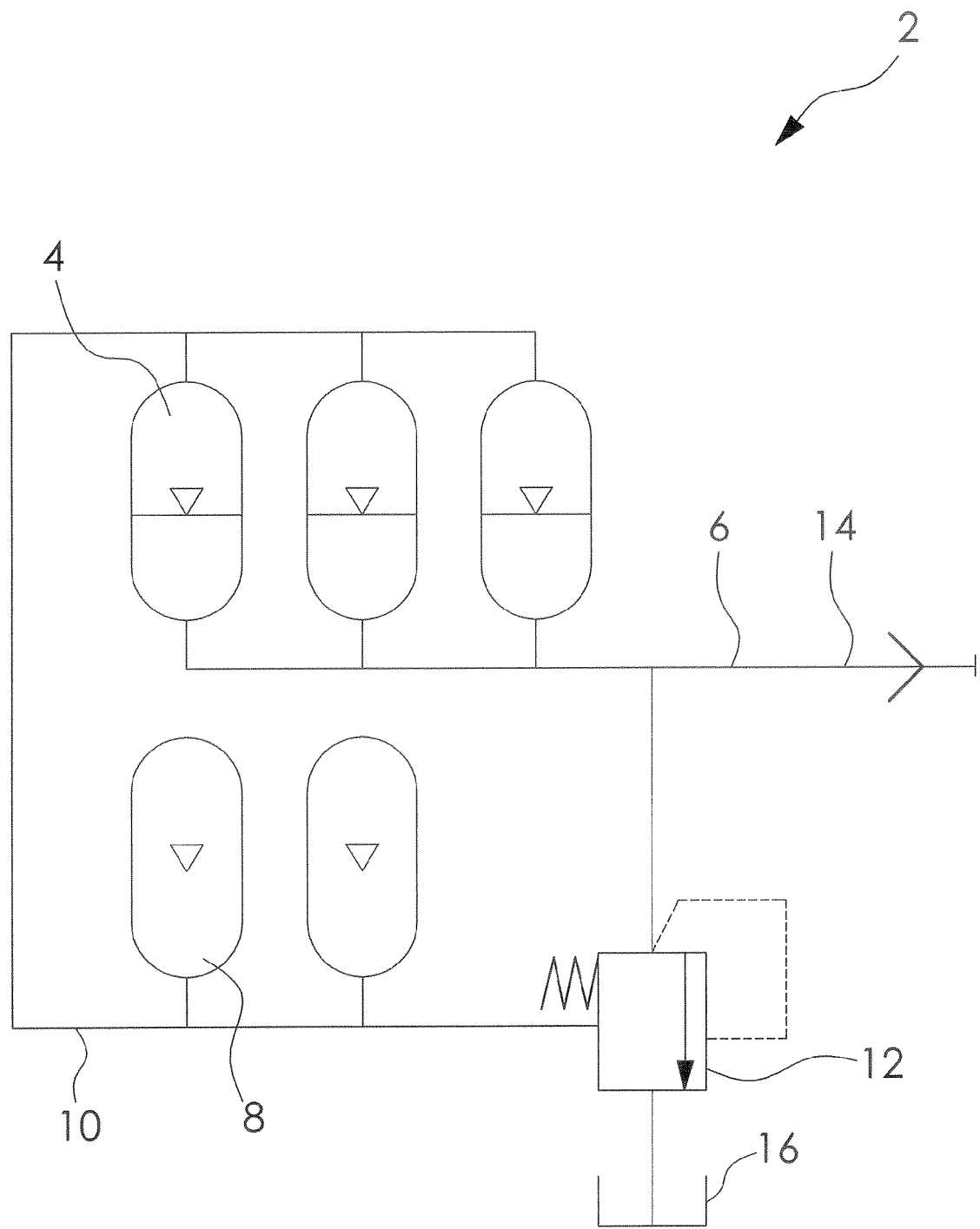
FIG. 1 shows a schematic view for of an accumulator system according to the present disclosure.

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

An overall schematic representation of an accumulator system 2 is shown in FIG. 1. The accumulator system 2 is comprised of at least one accumulator cylinder 4, whose fluid-side connections are joined to a common fluid network 6; zero or more auxiliary gas cylinders 8, whose gas-side connections share a common gas network 10 with the accumulator cylinders 4, and a gas-mediated, differential pressure relief valve 12. The accumulator system 2 is coupled to the primary hydraulic circuitry by connector 14, and the relief valve 12 has a connection to a reservoir tank 16.

Figure 2:
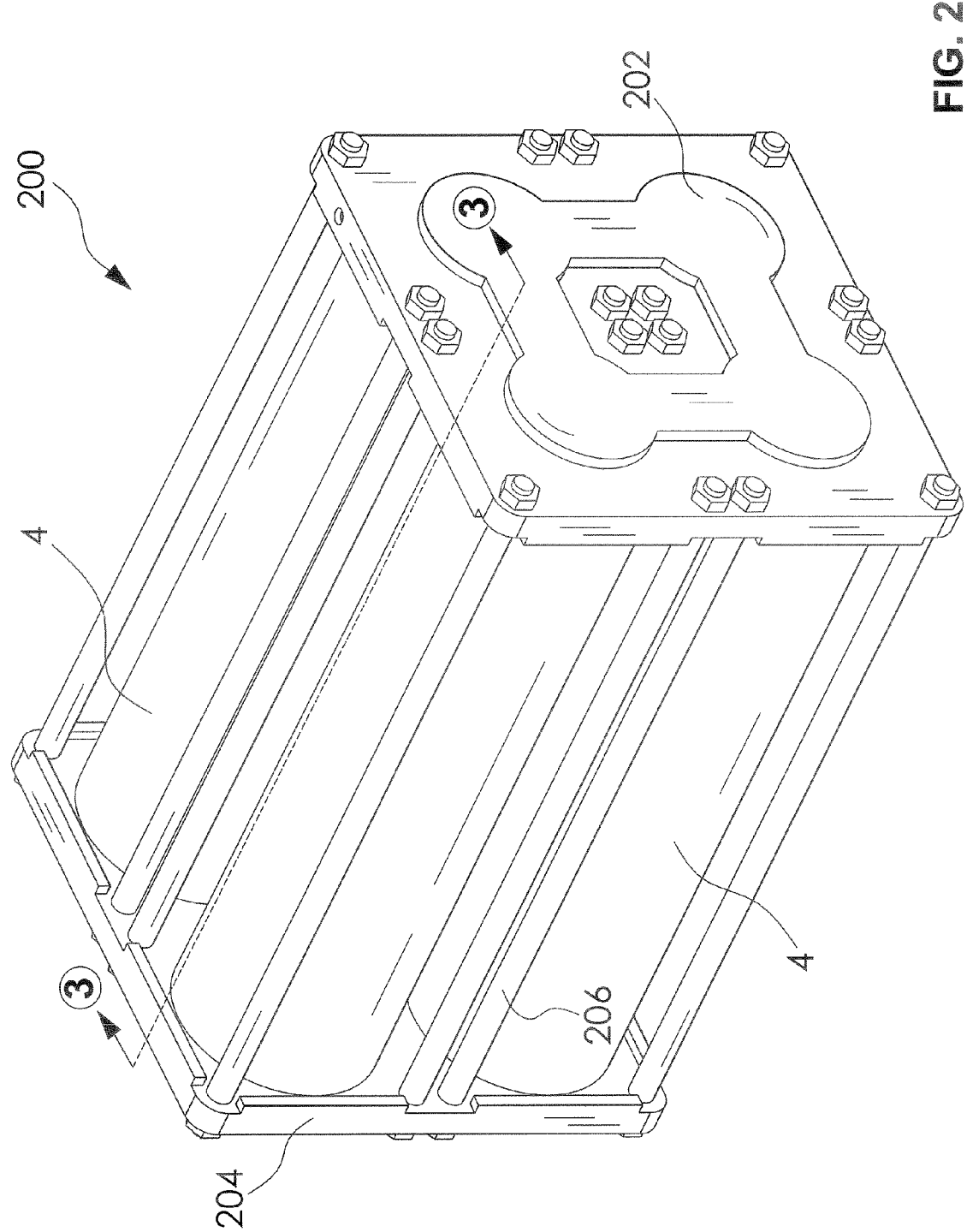
FIG. 2 shows an isometric view of one embodiment of an accumulator assembly for use in the accumulator system depicted in FIG. 1.

As shown in FIG. 2, a plurality of the accumulator cylinders 4 may be bound together as an accumulator assembly 200 for use in the accumulator system 2. A skilled artisan should appreciate that any number of the accumulator cylinders 4 may be disposed in the accumulator assembly 200. In a particular embodiment shown, the accumulator assembly 200 includes four of the accumulator cylinders 4. The accumulator cylinders 4 are disposed between a pair of axial closures 202, 204, for example, a fluid manifold 202 and a gas manifold 204. It should be appreciated that the fluid manifold 202 and the gas manifold 204 may be positioned at either the same or opposing ends of the accumulator assembly 200, as desired.

The axial closures 202, 204 are coupled together with at least one tension member 206 to thereby hold together the accumulator assembly 200. The tension member 206 can be a substantially rigid member such as a steel bolt, for example, or a pliable member such as a carbon fiber cable, for example. Other materials suitable for holding together the accumulator assembly 200 may be selected, as desired. Methods of fastening the tension member 206 include threaded fasteners, wedges embedded within the tension member 206, loops of a single tension member 206 material passed around stays, or 'weaving' the tension member 206. Other suitable methods of fastening the tension member 206 may be selected, as desired. It should be appreciated that the tension member 206 facilitates a minimization of the amount of material required to form the accumulator cylinder 4, since the tension member 206 is configured to bear the axial stresses of the accumulator cylinder 4.

Figure 3:
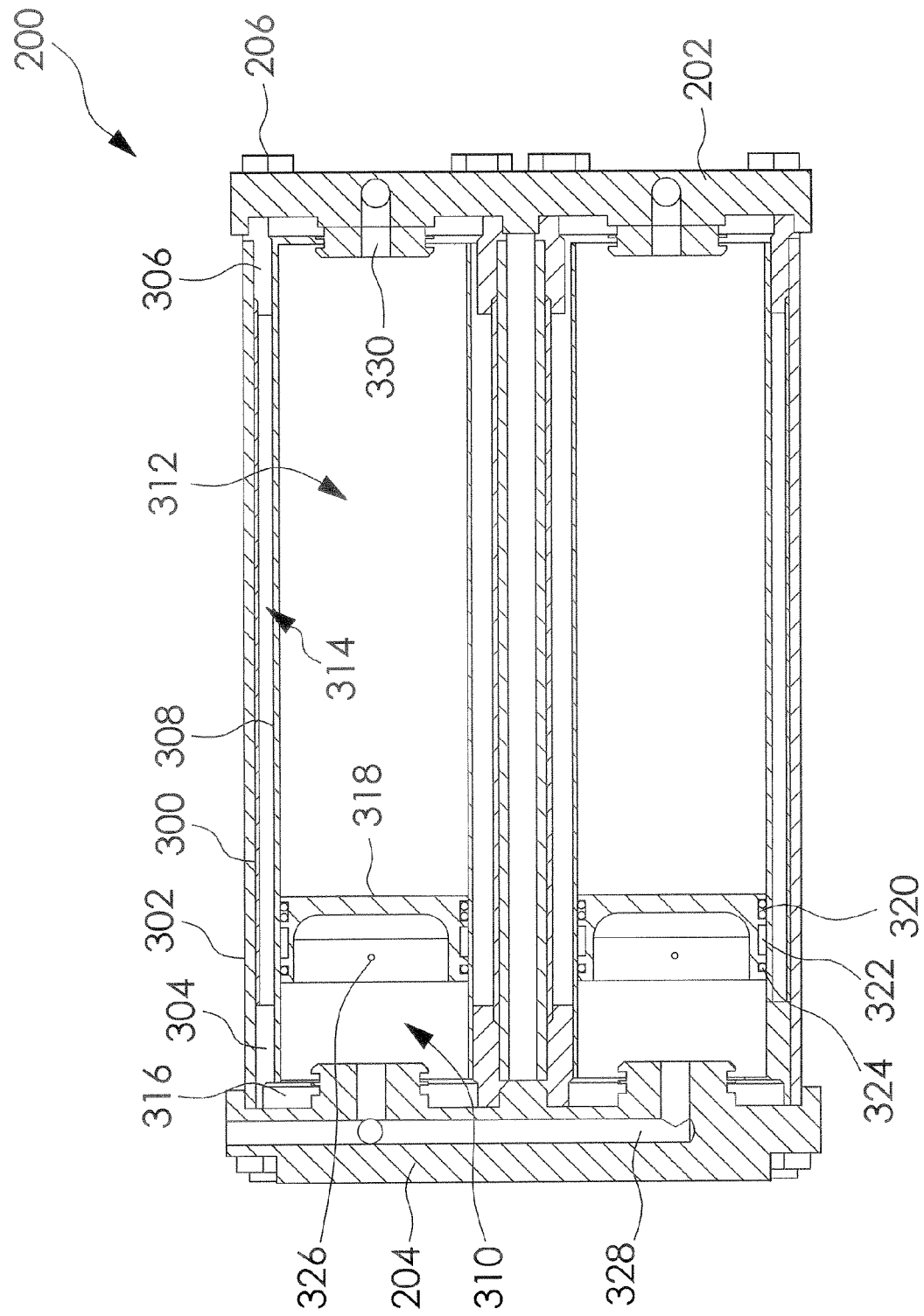
FIG. 3 shows a cross sectional view of the accumulator assembly depicted in FIG. 2, taken along section line 3-3.

Referring now to FIG. 3, the accumulator assembly 200 according to the present disclosure includes a plurality of the accumulator cylinders 4. Each of the accumulator cylinders 4 has an outer, substantially gas-impermeable shell 300. The shell 300 may be formed from any suitable material, such as at least one of a metal, a polymer, and a composite material, as desired. The shell may be formed from a material that is optimized for strength in relation to directional stresses, such as one of an axial stress and a hoop stress, for example. The shell 300 may have an over-wrap 302, as desired. The over-wrap 302 is typically formed of a strong lightweight material, such as carbon fiber, E-glass, or other suitable material as known in the art. The material of the over-wrap 302 may be wrapped to maximize an angle between the over-wrap 302 and an axial axis of the accumulator cylinder 4. A first metal boss 304 resides at the gas-side of the accumulator cylinder 4 and a second metal boss 306 resides at the fluid-side of the accumulator cylinder 4. The shell 300 is affixed to the first metal boss 304 and the second metal boss 306 using any substantially gas-impermeable means known in the art, such as welding, adhesive, sealant, and the like.

An inner sleeve 308 is disposed between the first metal boss 304 and the second metal boss 306. The inner sleeve 308 is divided into two chambers; a gas-side 310 first chamber and a fluid-side 312 second chamber. The gas-side 310 first chamber is configured to contain a gas, such as a nitrogen, helium, or other suitable gas as known in the art. In particular examples, the gas-side 310 first chamber additionally contains a foam. The fluid-side 312 second chamber is configured to contain a fluid, such as a hydrocarbon oil or other suitable fluid or gas as known in the art.

The inner sleeve 308 may be readily removable and replaceable. In other embodiments, the inner sleeve 308 may be serviceable. For example, the inner sleeve 308 may be selectively held in place by the first metal boss 304 and the second metal boss 306. Thus, it should be appreciated that a damaged accumulator assembly 200, wherein the damage is to the inner sleeve 308, may be inexpensively and easily repaired with the accumulator assembly 200 of the present disclosure.

The inner sleeve 308 may be constructed from a lightweight, gas-impermeable material. In one embodiment, the cylindrical impermeable sleeve 308 is made of a thin, non-metallic material, such as a composite material, for example. In another embodiment, the cylindrical impermeable sleeve is formed from a sheet metal, such as steel, for example. Other suitable gas-impermeable materials may be selected as desired.

It should be further understood that having the first metal boss 304 and the second metal boss 306 disposed at opposite ends of the sleeve 308 may militate against numerous potential sleeve 308 failure concerns. Since the sleeve 308 is generally not cantilevered, the sleeve 308 is unlikely to deflect due to motion of the underlying accumulator cylinder 4. Accordingly, fatigue failure issues are obviated with the accumulator assembly 200 of the present disclosure.

An interstitial space 314 is formed between the shell 300 and the inner sleeve 308. For example, a specified clearance may be provided between the cylindrical impermeable inner sleeve 308 and the shell 300. The size of the inner sleeve 308 and the shell 300 may be chosen to contain a desired quantity of gas within the interstitial space 314. On the gas-side 310 of the accumulator cylinder 4, an opening 316 is provided in the first metal boss 304. The opening 316 allows passage of a gas from the gas-side 310 of the inner sleeve 308 to the interstitial space 314.

The gas-side 310 first chamber and the fluid-side 312 second chamber of the inner sleeve 308 are divided by a slidable, gas-impermeable piston 318. Sealing between the gas-side 310 first chamber and the fluid-side 312 second chamber is accomplished with a seal 320. The seal 320 may comprise two O-rings, for example. The seal 320 comprising two O-rings may be separated by a backup ring, or other methods typical of the art. The piston 318 may include at an annular ring 322, which is preferably an O-ring, and an alignment bearing 324.

To ensure that piston 318 maintains good sealing in sleeve 6 during the useful lifetime of the accumulator assembly 200, the seals 320, 324 should be as widely spaced as possible. However, in so doing, the pressure on the outside of the sleeve 308 can cause micro-deformations of said sleeve 6, causing the sleeve 308 to rub on the piston 318. To militate against the rubbing of the sleeve 308 and the piston 318, the annular ring 322 is produced on the piston 318 and a hole 326 is produced in the piston 318 to allow the gas-side 310 first chamber to communicate with the annular ring 322. The hole 326 provides a mechanically stable piston 318 that does not produce undue stresses on the sleeve 308, thereby allowing for a lighter sleeve 308. The communication of the first chamber with the annular ring 322 may minimize the sleeve 308 and piston 318 contact area. To effectively seal the piston 318, two of the seal 320 are generally placed on the outside of the piston 318 adjacent the fluid-side 312 face of the piston 318. To ensure that the piston 318 moves without cocking or jamming, an optional third seal may be placed adjacent the gas-side 310 face of the piston 318 distal the seal 320.

The axial closures 202, 204 seal the ends of the accumulator assembly 200. The axial closures 202, 204 may have at least one planar surface. In particular embodiments, the axial closures 202, 204 are fluid and gas manifolds 202, 204 that seal at least one of the accumulator cylinders 4 disposed in the accumulator assembly 200. The gas manifold 204 may further have a gas port 328 formed therein that connects the gas-side 310 of each the accumulator cylinders 4 disposed in the accumulator assembly 200 and all auxiliary gas cylinders 8, if present in the accumulator system 2. The fluid manifold 204 may further have a fluid port 330 that connects the fluid-side 312 of each of the accumulator cylinders 4 in the accumulator assembly 200.

It should be appreciated that when used, the auxiliary gas cylinders 8 may have substantially the same structure as the accumulator cylinder 4, less the sleeve 308 and the piston 318, for example. A skilled artisan should further appreciate that other auxiliary gas cylinder 8 designs may be employed, as desired.

Assembly and maintenance of the accumulator system 2 and the accumulator assembly 200 according to the present invention is greatly facilitated by the design of the accumulator assembly 200. Assembly is achieved by the steps of placing the piston 318 into sleeve 308, inserting metal boss 304 and metal boss 306 into the wrapped shell 300, inserting the sleeve 308 into the shell 300, and placing the at least one accumulator cylinder 4 and/or more auxiliary air cylinders 8 between the axial closures 202, 204. The at least one tension member 206 is then added to the accumulator assembly 200 and tightened, as desired. Should the performance of the accumulator system 2 indicate a wearing or possible failure of an internal part, the assembly procedure is simply reversed to open the accumulator assembly 200.

Since the material and thickness of sleeve 308 are not intended to carry load, as the pressure on the gas-side 310 first chamber and fluid-side 312 second chamber are nominally equal, a mechanism is provided to deal with the two instances in which this assumption can fail. These cases are an anomalous high fluid pressure or a loss of gas pressure. In both cases, the piston 318 would move to the left, as shown in FIG. 3, until such time as the piston 318 bottoms out on the gas manifold 204. Once this occurs, any further fluid pressure buildup or gas pressure reduction would cause the sleeve 308 to undesirably bear load. The differential pressure relief valve 12 can mitigate the undesirable bearing of load by the sleeve 308.

Figure 4A:
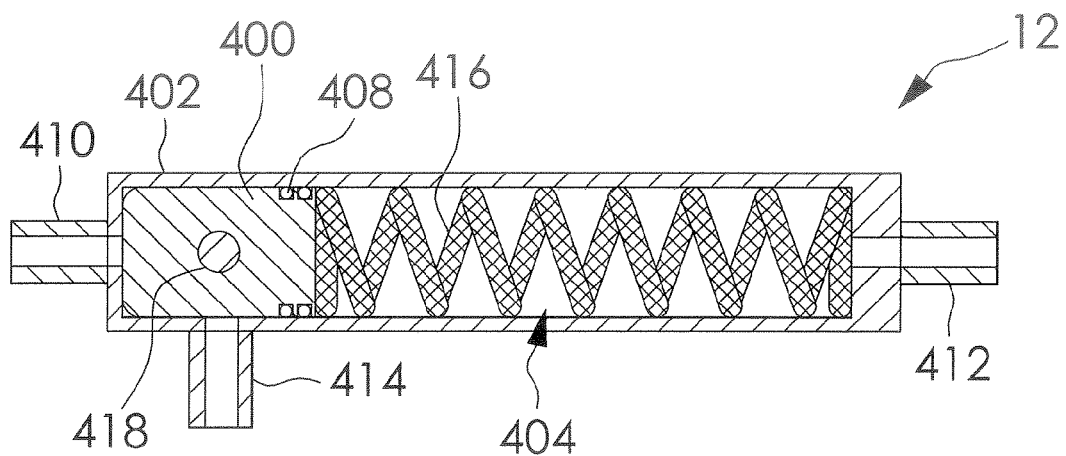
FIG. 4A shows a cross sectional view of a differential pressure relief valve for use with the accumulator system of the present disclosure.
Figure 4B:
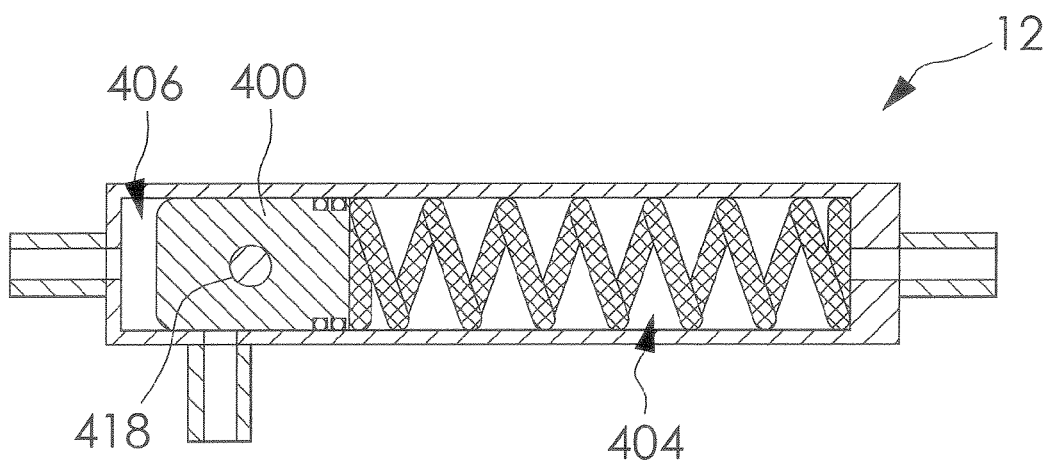
FIG. 4B shows a cross sectional view of the differential pressure relief valve depicted in FIG. 4A, the valve shown with a piston blocking a relief port.
Figure 4C:
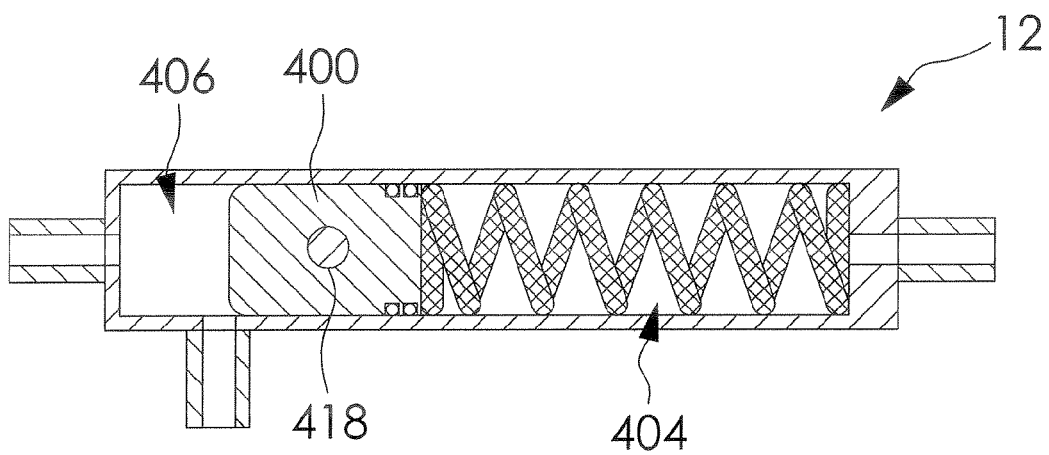
FIG. 4C shows a cross sectional view of the differential pressure relief valve depicted in FIGS. 4A and 4B, the valve shown with the relief port opened.

An illustrative embodiment of the gas-mediated, differential pressure relief valve 12 of the present disclosure is depicted in FIGS. 4A, 4B, and 4C. The differential pressure relief valve 12 includes a valve piston 400 and a cylinder body 402. The piston 400 is slidably disposed and confined within the cylinder body 402. Like the accumulator cylinder 4, the differential pressure relief valve 12 has a valve gas-side 404 and a valve fluid-side 406. The sides 404, 406 are separated by a seal 408. The seal 408 is particularly embodied as a pair of O-rings with a spacer, for example.

The differential pressure relief valve 12 may be connected to, and in communication with, the fluid-manifold 202 of the accumulator assembly 200 by a valve fluid port 410, for example. The valve fluid port 410 may be formed in the cylinder body 402 at the valve fluid-side 406 thereof, for example. The differential pressure relief valve 12 may be connected to, and in communication with, the gas manifold 204 by a valve gas port 412. The valve gas port 412 may be formed in the cylinder body 402 at the valve gas-side 404 thereof, for example. The differential pressure relief valve 12 may be connected, and in communication with, the reservoir 16 by a drain relief port 414.

A differential pressure bias may be provided by a biasing means 416 disposed between the piston 400 and an end of the cylinder body 402 adjacent the valve gas port 412, for example. The biasing means 416 may be a spring, for example. One of ordinary skill in the art should understand that other suitable biasing means 416 for providing the difference pressure bias may be employed, as desired.

In a further embodiment, the differential pressure relief valve 12 may include at least one sensor 418. The sensor 418 may be disposed within the piston 400, on the piston 400, or adjacent the piston 400, for example. As a further nonlimiting example, the sensor 418 may be configured to monitor a position of the piston 400 within the cylinder body 402. The sensor 418 may include one of an electrical switch, a hydraulic switch, and a pneumatic switch. It should be appreciated that if the sensor 418 is activated, it may be desirable that the sensor 418 inform an operator that the accumulator system 2 may need to be served before losing operational performance of the accumulator system 2.

The causing of the sleeve 308 to undesirably bear load is militated against by use of the gas-mediated, differential pressure relief valve 12, depicted in FIGS. 4A to 4C. Under normal operations, the valve piston 400, with substantially equal area on both faces thereof, for example, would be displaced all the way to the left of the cylinder body 402, thereby blocking the drain relief port 414. The valve piston 400 is held in this position by a combination of the gas pressure, which is supplied to the cylinder body 400 by the valve gas port 412 and by the biasing means 416. The biasing means 416 is sized such, and has a sufficient spring constant, that when the difference between gas and fluid pressure, which enters the cylinder body 402 by the fluid port 410, exceeds a predetermined value, the drain relief port 414 is opened. Excess fluid, such as oil, is thereby allowed to return to the reservoir tank 16.

The performance of the accumulator system 2 can also be assessed using a thermodynamic model. By modeling the accumulator system 2, such as the one depicted in FIG. 1, energy stored can be calculated as a function of the gas-side 310 volume, the fluid-side 312 volume, and a minimum operating pressure for the accumulator system 2. Further manipulation of the model may yield useful results, such as one manipulation that yields maximum energy storage as a function of the minimum pressure, maximum pressure and fluid volume of the accumulator system 2. The model may be useful for the design engineer whom, guided by common practice and application needs, typically has a priori knowledge of the minimum pressure, maximum pressure, and fluid volume values. A final set of manipulation may further result in identification of a desired ratio of minimum and maximum pressure that yields optimal performance of the accumulator system 2. When the desired ratio is substituted into the model, it is found that to optimize stored energy, which is the goal of the design engineer of an hydraulic hybrid vehicle, the gas-side volume should be greater than the fluid-side volume.

There are at least two ways to achieve an optimal design for the accumulator system 2. A first method requires increasing a diameter of the shell 300 with respect to the sleeve 308, thereby creating a larger volume within the interstitial space 314. It should be appreciated that the approach of the first method causes the accumulator cylinder 4 to become larger and requires a thicker over-wrap 4 of the shell 300. A second method employs both the interstitial space 314 and at least one auxiliary cylinder 8. The approach of the second method provides greater design flexibility as the ratio of gas-side 310 to fluid-side 312 can be more easily varied. In addition, since the gas manifold 204 can be comprised of multiple connected sections, packaging the accumulator system 2 into a vehicle, for example, is facilitated with the approach of the second method.

While certain representative embodiments and details have been shown for purposes of illustrating the invention, it will be apparent to those skilled in the art that various changes may be made without departing from the scope of the disclosure, which is further described in the following appended claims.

What is claimed is:

1. An accumulator assembly, comprising:
at least one accumulator cylinder, including
a cylindrical, gas-impermeable shell;
a cylindrical, gas-impermeable sleeve disposed within and substantially concentric with the shell, an interstitial space formed between the sleeve and the shell;
a piston slidably disposed within the sleeve, the piston separating an interior of the sleeve into a first chamber configured to contain a compressed gas, and a second chamber configured to contain a pressurized fluid;
a pair of axial closures positioned at opposing ends of the accumulator cylinder; and
at least one tension member disposed between the axial closures and coupled thereto for holding the accumulator assembly together.

2. The accumulator assembly of claim 1, further comprising a composite over-wrap disposed on the shell, wherein the composite over-wrap of the shell has an orientation to provide maximum resistance to a hoop stress and minimal resistance to an axial stress.

3. The accumulator assembly of claim 1, wherein the sleeve is configured to rest independently of radial movement of the shell.

4. The accumulator assembly of claim 1, wherein the first chamber additionally contains a foam.

5. The accumulator assembly of claim 1, further comprising an annular seal on the piston to militate against communication between the first chamber and the second chamber.

6. The accumulator assembly of claim 1, further comprising an annular groove on the piston, the piston having a hole formed therein allowing gas to flow from the first chamber into the annular groove.

7. The accumulator assembly of claim 1, wherein at least one of the axial closures is readily removable to facilitate a replacement of the impermeable sleeve.

8. The accumulator assembly of claim 1, wherein the axial closures include at least one of a gas manifold and a fluid manifold, the gas manifold having a gas port formed therein and the fluid manifold having a fluid port formed therein.

9. The accumulator system of claim 8, wherein at least one of the gas manifold and the fluid manifold is formed from a unitary piece of material and forms the axial closure for the at least one accumulator cylinder.

10. The accumulator assembly of claim 8, comprising a plurality of the accumulator cylinders, wherein the gas manifold and the fluid manifold are each coupled to the cylinders and form flow paths for communication between the respective cylinders.

11. The accumulator assembly of claim 1, wherein the tension member is one of a rigid element and a pliable element.

12. The accumulator assembly of claim 11 wherein the tension member is a single, pliable element.

13. An accumulator system, comprising:
an accumulator assembly, including a plurality of accumulator cylinders, each having a cylindrical, gas-impermeable shell, a cylindrical, gas-impermeable sleeve disposed within and substantially concentric with the shell, an interstitial space formed between the sleeve and the shell, a piston slidably disposed within the sleeve, the piston separating an interior of the sleeve into a first chamber configured to contain a compressed gas, and a second chamber configured to contain a pressurized fluid, a pair of axial closures positioned at opposing ends of the accumulator cylinder, and at least one tension member disposed between the axial closures and coupled thereto for holding the accumulator assembly together; and at least one auxiliary gas cylinder in communication with the accumulator assembly.

14. The accumulator system of claim 13, the accumulator cylinders having gas ports and fluid ports formed therein, wherein the gas ports of each of the accumulator cylinders mutually communicate and the fluid ports of each of the accumulator cylinders mutually communicate.

15. The accumulator system of claim 14, wherein the axial closures include a plurality of gas manifolds and fluid manifolds, wherein each gas manifold and each fluid manifold is coupled to a single accumulator cylinder and each fluid and gas manifold is in respective mutual communication via a common network.

16. The accumulator system of claim 13, wherein the axial closures include a gas manifold and a fluid manifold, the accumulator system further comprising:

a low pressure fluid reservoir; and a gas-mediated, differential pressure relief valve including a hollow cylinder body having a fluid valve port formed at a first end of the cylinder body, a gas valve port formed at a second end of the cylinder body, and a drain relief port formed through a wall of the cylinder body, a valve piston slidably disposed within the cylinder body, and a spring disposed in the cylinder body between the piston and the second end wherein the gas valve port is in communication with the gas manifold, the fluid valve port is in communication with the fluid manifold, and the drain relief port is in communication with the low-pressure fluid reservoir.

17. The accumulator assembly of claim 1, wherein the interstitial space is in communication with the first chamber configured to contain the compressed gas.

18. The accumulator assembly of claim 17, wherein the interstitial space is configured to contain a desired quantity of gas therein.

* * * * *